(12) United States Patent
Robertson et al.

(10) Patent No.: US 11,645,926 B2
(45) Date of Patent: May 9, 2023

(54) USER INTERFACES FOR MUTUALLY EXCLUSIVE THREE DIMENSIONAL FLYING SPACES

(71) Applicant: Kitty Hawk Corporation, Palo Alto, CA (US)

(72) Inventors: Cameron Robertson, San Mateo, CA (US); Alex Roetter, San Francisco, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 199 days.

(21) Appl. No.: 17/110,220

(22) Filed: Dec. 2, 2020

(65) Prior Publication Data
US 2021/0082288 A1    Mar. 18, 2021

Related U.S. Application Data

(63) Continuation of application No. 16/553,786, filed on Aug. 28, 2019, now Pat. No. 10,909,862, which is a continuation of application No. 16/110,928, filed on Aug. 23, 2018, now Pat. No. 10,446,041.

(51) Int. Cl.
| | |
|---|---|
| *G08G 5/00* | (2006.01) |
| *G01C 23/00* | (2006.01) |
| *G06F 3/01* | (2006.01) |
| *B64D 43/02* | (2006.01) |
| *G08G 5/04* | (2006.01) |

(52) U.S. Cl.
CPC ............. *G08G 5/006* (2013.01); *B64D 43/02* (2013.01); *G01C 23/005* (2013.01); *G06F 3/016* (2013.01); *G08G 5/0021* (2013.01); *G08G 5/0086* (2013.01); *G08G 5/045* (2013.01)

(58) Field of Classification Search
USPC ............................................ 701/9
See application file for complete search history.

(56) References Cited

U.S. PATENT DOCUMENTS

| | | | | |
|---|---|---|---|---|
| 5,420,582 | A | * 5/1995 | Kubbat | G01C 23/005 340/975 |
| 5,920,321 | A | * 7/1999 | Owen | G01C 23/00 345/428 |
| 6,433,729 | B1 | 8/2002 | Staggs | |
| 6,653,947 | B2 | * 11/2003 | Dwyer | G01S 7/22 340/961 |
| 6,696,980 | B1 | * 2/2004 | Langner | G01C 23/00 701/14 |

(Continued)

FOREIGN PATENT DOCUMENTS

| | | |
|---|---|---|
| EP | 1764759 | 3/2007 |
| NZ | 724931 | 1/2018 |

*Primary Examiner* — Jonathan M Dager
(74) *Attorney, Agent, or Firm* — Van Pelt, Yi & James LLP

(57) ABSTRACT

Boundary information associated with a three-dimensional (3D) flying space is obtained, including a boundary of the 3D flying space. Location information associated with an aircraft is obtained, including a location of the aircraft. Information is presented based at least in part on the boundary information associated with the 3D flying space and the location information associated with the aircraft, including by presenting, in a display, the boundary of the 3D flying space and an avatar representing the aircraft at the location of the aircraft.

20 Claims, 12 Drawing Sheets

(56) References Cited

U.S. PATENT DOCUMENTS

| | | | |
|---|---|---|---|
| 7,010,398 B2* | 3/2006 | Wilkins, Jr. | G01C 23/005 701/1 |
| 7,598,888 B2* | 10/2009 | Matuska | G01C 5/005 340/963 |
| 7,603,209 B2* | 10/2009 | Dwyer | G08G 5/0013 701/4 |
| 7,693,621 B1* | 4/2010 | Chamas | G08G 5/0065 701/16 |
| 7,869,943 B1* | 1/2011 | Simon | G01C 23/005 701/14 |
| 8,140,197 B2* | 3/2012 | Lapidot | G02B 27/017 701/428 |
| 8,160,755 B2* | 4/2012 | Nichols | G06T 11/206 342/29 |
| 8,339,283 B2* | 12/2012 | Filliatre | G01C 23/005 340/905 |
| 8,362,925 B2* | 1/2013 | Brinkman | G08G 5/0052 701/4 |
| 8,527,118 B2* | 9/2013 | Jones | G01C 23/00 244/76 R |
| 8,581,748 B1* | 11/2013 | Barber | G01S 1/047 340/971 |
| 8,786,633 B2* | 7/2014 | Dairman | G01C 23/00 345/638 |
| 8,849,477 B2* | 9/2014 | Brinkman | G01C 23/00 701/16 |
| 8,849,483 B2* | 9/2014 | Kuwata | G05D 1/00 701/519 |
| 8,965,601 B1* | 2/2015 | Barber | G01C 23/005 340/975 |
| 8,983,689 B2* | 3/2015 | Putz | G08G 5/0021 701/18 |
| 9,014,880 B2* | 4/2015 | Durling | G08G 5/0008 701/4 |
| 9,020,663 B2* | 4/2015 | Smith | G01C 23/005 340/963 |
| 9,086,280 B2* | 7/2015 | Gurusamy | G01C 23/005 |
| 9,117,368 B2* | 8/2015 | Agarwal | G08G 5/0013 |
| 9,132,913 B1* | 9/2015 | Shapiro | G08G 5/0086 |
| 9,147,349 B2* | 9/2015 | Maddanimath | G08G 5/0021 |
| 9,237,313 B2* | 1/2016 | Aspen | H04N 7/18 |
| 9,354,078 B2* | 5/2016 | Burgin | G08G 5/0065 |
| 9,405,005 B1* | 8/2016 | Arteaga | G08G 5/0021 |
| 9,495,877 B2* | 11/2016 | Duffy | G08G 5/0013 |
| 9,501,060 B1* | 11/2016 | Zhang | B64D 47/08 |
| 9,508,264 B2 | 11/2016 | Chan | |
| 9,530,323 B1 | 12/2016 | Maji | |
| 9,728,089 B2* | 8/2017 | Marcus | G08G 5/0034 |
| 9,734,723 B1* | 8/2017 | Bruno | G06Q 10/00 |
| 9,875,659 B2* | 1/2018 | Feyereisen | G08G 5/0086 |
| 10,037,706 B1* | 7/2018 | Cutler | G05D 1/0833 |
| 10,109,206 B2* | 10/2018 | Ichihara | G08G 5/006 |
| 10,147,329 B2* | 12/2018 | Liu | B64C 39/024 |
| 10,438,495 B1* | 10/2019 | Robertson | G08G 5/0091 |
| 10,446,041 B1* | 10/2019 | Robertson | B64D 43/00 |
| 10,538,324 B2* | 1/2020 | Fengler | G05D 1/0055 |
| 10,586,463 B2* | 3/2020 | Xu | G05D 1/0214 |
| 10,598,932 B1 | 3/2020 | Marshall | |
| 11,282,307 B2* | 3/2022 | Yoshimura | G07C 5/0808 |
| 2002/0053983 A1* | 5/2002 | Chamas | G01C 23/005 340/979 |
| 2003/0137444 A1* | 7/2003 | Stone | G08G 5/0008 342/182 |
| 2003/0151630 A1* | 8/2003 | Kellman | G08G 5/0013 715/838 |
| 2004/0015274 A1* | 1/2004 | Wilkins, Jr. | G01C 23/005 701/3 |
| 2005/0200501 A1* | 9/2005 | Smith | G08G 5/0082 340/963 |
| 2005/0206533 A1* | 9/2005 | Rogers | G01C 23/00 340/972 |
| 2006/0241820 A1* | 10/2006 | Dwyer | G08G 5/006 701/3 |
| 2006/0265109 A1* | 11/2006 | Canu-Chiesa | G08G 5/045 701/3 |
| 2007/0168122 A1* | 7/2007 | Aspen | G01C 23/005 701/3 |
| 2007/0235594 A1* | 10/2007 | Wingett | B64C 13/02 244/223 |
| 2008/0051947 A1* | 2/2008 | Kemp | G08G 5/006 701/3 |
| 2008/0142642 A1* | 6/2008 | Marino | B64C 13/507 244/223 |
| 2008/0147320 A1* | 6/2008 | Burch | G08G 5/006 701/431 |
| 2009/0105890 A1* | 4/2009 | Jones | B64C 13/18 701/1 |
| 2009/0210109 A1* | 8/2009 | Ravenscroft | G01C 21/20 701/25 |
| 2010/0023187 A1* | 1/2010 | Gannon | G01C 23/00 701/4 |
| 2010/0094487 A1* | 4/2010 | Brinkman | G01C 25/00 701/14 |
| 2010/0145599 A1* | 6/2010 | Wise | G08G 5/0021 701/120 |
| 2010/0280753 A1* | 11/2010 | Chytil | G01C 21/32 715/810 |
| 2010/0292871 A1* | 11/2010 | Schultz | G01C 21/3852 342/29 |
| 2010/0332056 A1* | 12/2010 | Kirk | G01W 1/08 701/14 |
| 2011/0077804 A1 | 3/2011 | He | |
| 2011/0202206 A1* | 8/2011 | Karthikeyan | G01C 23/00 701/3 |
| 2011/0231036 A1* | 9/2011 | Yogesha | G08G 5/0021 701/3 |
| 2012/0194556 A1* | 8/2012 | Schmitt | G08G 5/0078 345/650 |
| 2013/0060405 A1* | 3/2013 | Komatsuzaki | G08G 5/006 701/3 |
| 2013/0138275 A1* | 5/2013 | Nauman | G08G 5/0021 701/16 |
| 2013/0234884 A1* | 9/2013 | Bunch | G01S 13/953 342/26 B |
| 2013/0261850 A1* | 10/2013 | Smith | G08G 5/0021 701/3 |
| 2014/0018979 A1* | 1/2014 | Goossen | G06Q 10/047 701/3 |
| 2014/0266807 A1* | 9/2014 | Behara | G01C 23/00 340/978 |
| 2015/0254988 A1* | 9/2015 | Wang | G08G 5/0052 701/3 |
| 2015/0325064 A1* | 11/2015 | Downey | B64C 39/024 701/29.3 |
| 2016/0163203 A1* | 6/2016 | Wang | G05D 1/106 701/3 |
| 2017/0248969 A1 | 8/2017 | Ham | |
| 2017/0278404 A1* | 9/2017 | Gordon | G05D 1/106 |
| 2017/0285662 A1* | 10/2017 | Cherepinsky | B64C 13/00 |
| 2017/0320589 A1* | 11/2017 | Moravek | G08G 5/0013 |
| 2017/0334559 A1 | 11/2017 | Bouffard | |
| 2017/0357273 A1* | 12/2017 | Michini | G05D 1/0022 |
| 2017/0372618 A1* | 12/2017 | Xu | G08G 5/0069 |
| 2018/0068567 A1* | 3/2018 | Gong | G08G 5/006 |
| 2018/0204469 A1* | 7/2018 | Moster | G08G 5/0034 |
| 2018/0268721 A1* | 9/2018 | McCullough | G06F 3/04845 |
| 2022/0185471 A1 | 6/2022 | Michini | |
| 2022/0214703 A1* | 7/2022 | Zhong | G05D 1/106 |

* cited by examiner

USER INTERFACES FOR MUTUALLY EXCLUSIVE THREE DIMENSIONAL FLYING SPACES

CROSS REFERENCE TO OTHER APPLICATIONS

This application is a continuation of U.S. patent application Ser. No. 16/553,786 entitled USER INTERFACES FOR MUTUALLY EXCLUSIVE THREE DIMENSIONAL FLYING SPACES filed Aug. 28, 2019, which is a continuation of U.S. patent application Ser. No. 16/110,928, now U.S. Pat. No. 10,446,041, entitled USER INTERFACES FOR MUTUALLY EXCLUSIVE THREE DIMENSIONAL FLYING SPACES filed Aug. 23, 2018, both of which are incorporated herein by reference for all purposes.

BACKGROUND OF THE INVENTION

New types of aircraft are being developed for use by relatively inexperienced pilots (e.g., without a pilot's license and/or without extensive flight training). New user interfaces to provide information to such inexperienced pilots during flight would be desirable, for example, because the aircraft is operating in a new and/or different manner compared to existing aircraft for the ease and/or benefit of relatively inexperienced pilots. The user interface may provide or otherwise present information which helps the pilot to better understand how the aircraft operates (e.g., in the new and/or different ways) and have a better and/or more informed flight experience.

BRIEF DESCRIPTION OF THE DRAWINGS

Various embodiments of the invention are disclosed in the following detailed description and the accompanying drawings.

DETAILED DESCRIPTION

Figure 1:
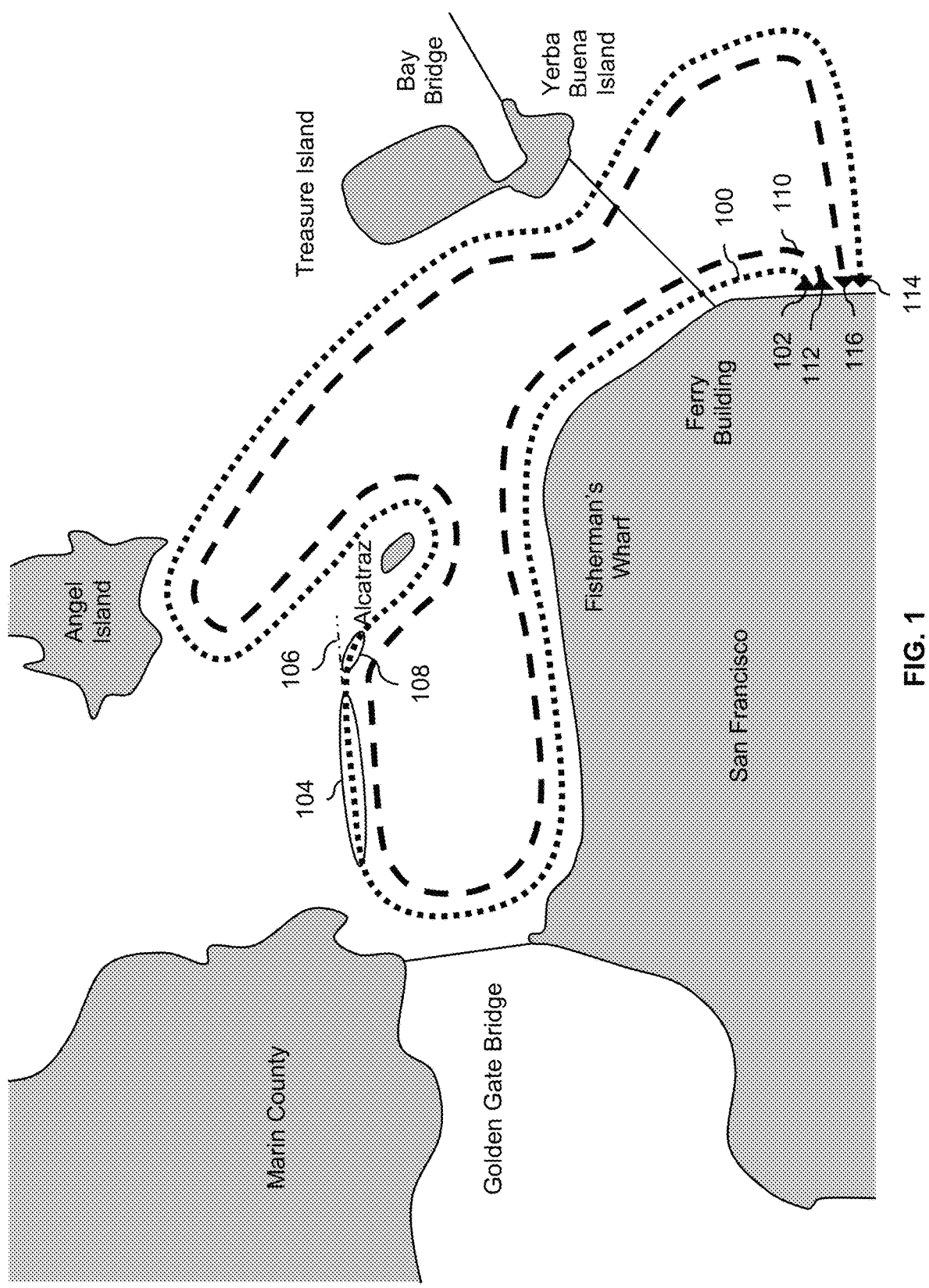
FIG. 1 is a diagram illustrating an embodiment of three-dimensional (3D) flying spaces associated with a permitted route.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of user interfaces and/or techniques to present information associated with a three-dimensional (3D) flying space and/or position or location information associated with the aircraft (e.g., where the aircraft is automatically constrained or otherwise configured to stay within its 3D flying space, even if the pilot attempts to leave the 3D flying space) are described herein. First, some examples of 3D flying spaces are described. Then, various embodiments of user interfaces and/or techniques to present information associated with such 3D flying spaces are described.

In the example shown, a person can get on an aircraft and take a tour of sights on the San Francisco Bay and along the San Francisco waterfront. For example, the person may first watch a safety video which includes instructions on how to fly the aircraft and is then permitted to rent an aircraft. In one example, the aircraft has floats (e.g., so that the aircraft is buoyant on water) and the pilot performs a vertical takeoff from water.

The pilot guides their plane so that it enters the first 3D flying space (100) at the entrance (102) to that permitted route. Using the controls and/or input devices of the aircraft (e.g., a joystick), the pilot is permitted to fly their aircraft within the three-dimensional space defined by 3D flying space 100 as desired but is not permitted to deviate from the permitted path or route shown. For example, some types of aircraft can hover in place and the pilot may (if desired) stop along the route or path (e.g., with the aircraft hovering in-air) to take pictures of iconic and/or scenic San Francisco landmarks. Alternatively, they can fly along the first 3D flying space (100) as fast or as slow as they want without stopping.

A more formal way of describing this type of 3D flying space is to say that it includes at least one entrance and exit and that the length (i.e., the distance measured from the entrance to the exit) is the largest dimension compared to a height or a width (e.g., associated with a cross-sectional area).

As an example of how the pilot is not permitted to steer or otherwise guide the aircraft outside of a 3D flying space, suppose that the pilot is in straight section 104 of 3D flying space 100. To fly through this straight section 104, the pilot will push their joystick forward (e.g., assuming the input device is a joystick). If the pilot is not paying attention and keeps pushing the joystick forward when the straight section ends and 3D flying space 100 begins to turn to the pilot's right at bend 108, the aircraft will not permit the pilot to steer or otherwise guide the aircraft outside of the permitted path or route corresponding to 3D flying space 100 shown here. In this example, the pilot's instruction (in this example, to fly straight forward even though the permitted route turns) would be interpreted or handled by the aircraft in the following manner. Since the pilot's desired direction of flight (e.g., corresponding to path or trajectory 106) is not completely orthogonal to bend 108, the aircraft will continue to move (e.g., as opposed to stopping and hovering midair), but will turn so that the aircraft follows bend 108 and will not fly along forward path or trajectory 106, even though the pilot is holding the joystick forward. In contrast, other types of aircraft (e.g., which have no understanding of a 3D flying space and/or which are not configured to respect the boundaries defined by a 3D flying space) would obey the pilot's input and those aircraft would continue on the forward path or trajectory (106) which deviates from the bend (108) in 3D flying space 100.

In 3D flying space 100 shown here, the selected route or path may be helpful in preventing pilots from flying into more dangerous and/or restricted areas. For example, the winds west of the Golden Gate Bridge may be significantly stronger than the winds east of the bridge, making flying much more difficult in that area. In this example, the pilots may be relatively inexperienced and/or tourists unfamiliar with the area and so a 3D flying space or permitted path which keeps an aircraft east of the Golden Gate Bridge (as shown here) will prevent the pilot and aircraft from entering more dangerous areas. Similarly, the exemplary 3D flying space shown here keeps the pilot and aircraft from entering protected airspaces associated with the Oakland or San Francisco airports.

A 3D flying space also helps to prevent collisions between two aircraft. For example, suppose a second pilot came along and wanted to take the same tour as the first pilot. The second pilot and their aircraft would be assigned to the second 3D flying space (110). Accordingly, they would enter the second entrance (112) associated with the second 3D flying space (110). Even if the first pilot is very slow (e.g., making many stops along the way), the second pilot will not run into the first pilot's aircraft because the first 3D flying space (100) and the second 3D flying space (110) do not intersect or otherwise overlap. Rather, the two permitted paths run parallel to each other from the entrances (102 and 112) all the way to the exits (114 and 116).

The following figure shows some exemplary cross-sectional areas associated with 3D flying space 100 and 110.

Figure 2:
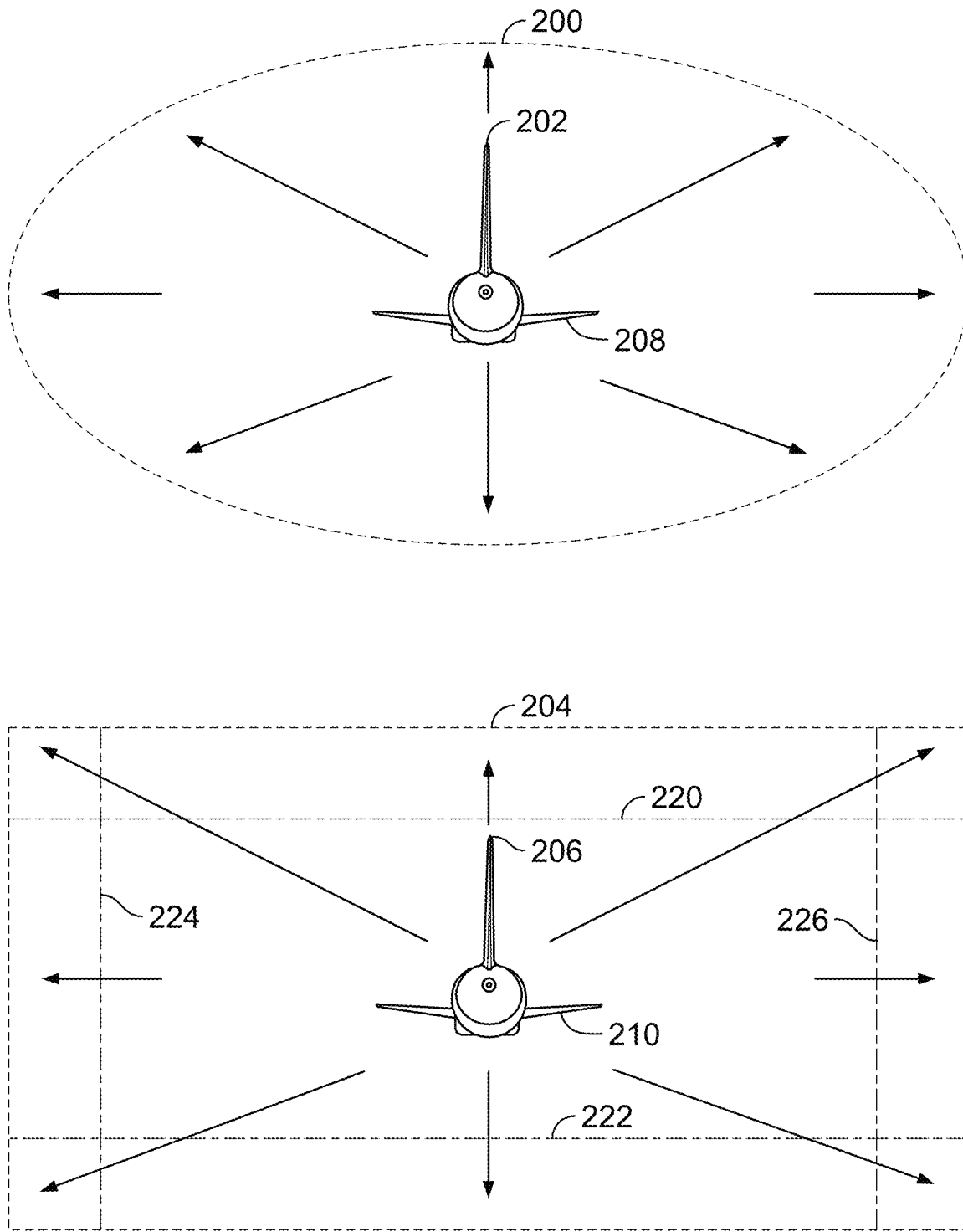
FIG. 2 is a diagram illustrating embodiments of cross-sectional areas associated with a three-dimensional (3D) flying space.

FIG. 2 is a diagram illustrating embodiments of cross-sectional areas associated with a three-dimensional (3D) flying space. In some embodiments, 3D flying spaces 100 and 110 in FIG. 1 have cross-sectional areas as shown here.

Cross-sectional area 200 shows an example where a 3D flying space has an elliptical cross-sectional area. Aircraft 202 shows an example of an aircraft which is constrained or otherwise configured to remain within the boundaries of a 3D flying space, including cross-sectional area 200, even if the pilot indicates, via the controls or input devices, that they want to fly outside of cross-sectional area 200. The pilot is permitted to steer or otherwise move the aircraft within cross-sectional area 200, so long as the plane does not move or otherwise fly beyond the boundary associated with cross-sectional area 200. For example, if the pilot was hovering and wanted to move upwards, that would be permitted so long as aircraft 202 does not move beyond the boundary associated with cross-sectional area 200. Otherwise, the pilot's input would be ignored (e.g., as the aircraft got closer to a top boundary, the aircraft would slow to a stop, even if/while an up-down thumbwheel used to control attitude were still being pushed up).

Generally speaking, user interfaces and/or techniques to present information (e.g., to show the boundaries of the 3D flying space, the aircraft's position within the 3D flying space, etc.) are independent of the aircraft's (e.g., automated) response and/or intervention to keep the aircraft within the 3D flying space. For example, a user interface may present a warning that the aircraft is getting too close to the boundary of the 3D flying space at a first distance from the boundary, but may not actually take action in response to the aircraft's proximity to the boundary until the aircraft is closer (e.g., by automatically slowing down and stopping the aircraft before it crosses the boundary of the 3D flying space, by automatically turning the aircraft to follow a turn in a path, etc.). To put it another way, the distance (e.g., from the boundary of a 3D flying space) at which a warning message or notification is displayed by a user interface is not necessarily the same as the distance (e.g., again from the boundary of a 3D flying space) at which the aircraft intervenes and/or ignores a pilot's input in order to keep the aircraft within the 3D flying space. For example, by displaying or issuing a warning sooner before any intervention is performed may give the pilot an opportunity to correct the aircraft's path or trajectory before the aircraft begins to ignore the pilot's instruction(s) and/or otherwise intervene to keep the aircraft in the 3D flying space.

Cross-sectional area 204 shows an example where a 3D flying space has a rectangular cross-sectional area. As before, aircraft 206 is permitted to move about within cross-sectional area 204 per the input of the pilot (e.g., via a joystick, control, or other input device), so long as those instructions would not cause aircraft 206 to move beyond the boundaries of cross-sectional area 204. Elliptical cross section 200 and rectangular cross section 204 are merely two examples and any type of cross-sectional area or 3D flying space in general may be used.

In some embodiments, a cross-sectional dimension of a 3D flying space (e.g., radius, height, width, etc.) is based at least in part on the potential obstacles a pilot may encounter and would like to avoid. For example, on the San Francisco Bay where there are many different types of ships, a 3D flying space (e.g., 200 or 204) could be wide enough to avoid large tanker vessels or cargo containers and/or high enough to avoid sailboat masts. Naturally, whatever the dimensions, the 3D flying space would still be mutually exclusive and constructed to avoid areas of danger and/or concern.

In some embodiments, a 3D flying space is expressed in an efficient manner which reduces an amount of storage used (e.g., on an aircraft which stores the 3D flying space) and/or bandwidth consumed (e.g., if the 3D flying space is sent from and/or assigned by an assignor and the information is exchanged over some (e.g., wireless) network). In one example, a 3D flying space is broken up into one or more segments (i.e., the 3D flying space is defined piecewise) and each segment is expressed or otherwise represented using: (1) a center path (e.g., an imaginary line in the center of the cross section of the 3D flying space) and (2) a cross section about the center path.

In one example of the center path, suppose that the 3D flying space includes different segment types (e.g., some combination of linear segments and curved segments). A first segment may have a center path defined as a line from (e.g., GPS) coordinates (a, b) to (e.g., GPS) coordinates (c, d). Then, the next segment has a center path which is circular from coordinates (e, f) to (g, h) with a radius of 200 meters.

In one example of the cross section, the cross section may include a specification or selection of a shape type from one of several possible or permitted shapes (e.g., circle, ellipse, rectangle, etc.) with defined parameters that are relevant for that shape type (e.g., height and width for rectangular cross sections, radius for circular cross sections, etc.).

In some embodiments, there are "gaps" between adjacent or successive segments of a 3D flying space and interpolation is performed on-board the aircraft to determine the boundaries of the 3D flying space between the (e.g., explicitly and/or piecewise-defined) segments. Naturally, the interpolation is performed in a manner that ensures the 3D flying spaces are mutually exclusive. Using on-board interpolation may help to further improve the efficient representation of a 3D flying space (e.g., so that storage space and/or bandwidth consumption is further reduced).

In a similar approach, in some embodiments, segments are touching and/or contiguous but smoothing is performed where adjacent or successive segments meet. For example, suppose that the 3D flying space may be defined as piecewise, overlapping linear segments where on-board smoothing is performed so that the 3D flying space has rounded turns (e.g., for a smoother and/or more natural flying experience) instead of sharp, abrupt turns where the linear segments join each other. This may support an efficient manner in which to represent or otherwise store a 3D flying space while also supporting or otherwise enabling a smoother and/or more natural flying experience.

Returning to FIG. 1, for simplicity and ease of explanation, the exemplary 3D flying spaces shown there (100 and 110) each have a single entrance (102 and 112, respectively) and a single exit (114 and 116, respectively). In some embodiments, a 3D flying space has multiple entrances and/or exits. For example, if 3D flying spaces 100 and 110 were modified as such, this would permit people to land and get out of the aircraft at various spots of interest (e.g., Fisherman's Wharf, near the Golden Gate Bridge, on Angel Island, etc.) instead of being forced to remain in the aircraft for the entire ride. In some embodiments, the (e.g., additional) entrances and exits are routed in 3D space so that they do not overlap or otherwise intersect with other 3D flying spaces associated with other pilots and/or other aircraft. In some embodiments, there is a single, bidirectional entrance and exit (e.g., instead of having a dedicated, unidirectional entrance like entrances 102 and 112 and a dedicated, unidirectional exit like exits 114 and 116) for more compact routing and/or efficient use of (air)space.

As will be described in more detail below, a 3D flying space is virtual and it is not necessary to have infrastructure and/or devices in place in order for a 3D flying space to be defined and/or respected. For example, with this technique, it is not necessary for some physical device to be present or otherwise installed to (as an example) indicate or assign a 3D flying space to a particular aircraft. Rather, as will be described in more detail below, the aircraft has a sense of its location in the air and where the boundaries of the 3D flying space are. Both of these things enable the aircraft to stay within a 3D flying space, including by ignoring pilot input as/if needed.

In some embodiments, a 3D flying space is dynamic and/or temporal (e.g., lasting only for some time and not forever). For example, when the winds on the San Francisco Bay are strong, it may be desirable to have a larger distance between two adjacent 3D flying spaces. In one example, each morning, before people are permitted to take the aircraft out along the permitted routes, the distance between two adjacent 3D flying spaces is set according to the weather (e.g., with a larger separation if the winds are strong). To accommodate the larger separations, the number of 3D flying spaces may be decreased.

In the example of FIG. 1, the 3D flying spaces are unidirectional paths or routes with permitted directions of flight (i.e., they are one-way). That is, the aircraft are, under normal conditions where there is no emergency, only permitted to fly in a generally clockwise direction around the paths shown. In some embodiments, this unidirectional rule is lifted in the event of an emergency. Alternatively, a 3D flying space may not necessarily have a permitted direction of flight.

Although the techniques described herein may be used with any appropriate type of aircraft, the exemplary aircraft shown here in FIG. 2 may be desirable in some applications for the following reasons. The exemplary aircraft (202 and 206) are capable of performing a vertical takeoff and landing and have a relatively small size. This may be attractive in urban and/or densely populated areas such as San Francisco because there is no need for a long runway in order to take off and land. The exemplary aircraft (202 and 206) also include floats (208 and 210) which permit the aircraft to take off and land from water in addition to land. For example, the 3D flying spaces shown in FIG. 1 are located entirely over water, not over land. Flying over water is safer than flying over land (e.g., in the event of a crash or hard landing) and it may be easier to find open waterfront locations for takeoffs and landings compared to finding open land/ground for that purpose.

The 3D flying spaces described above are merely exemplary and are not intended to be limiting. The following figures describe another embodiment of a 3D flying space.

Figure 3A:
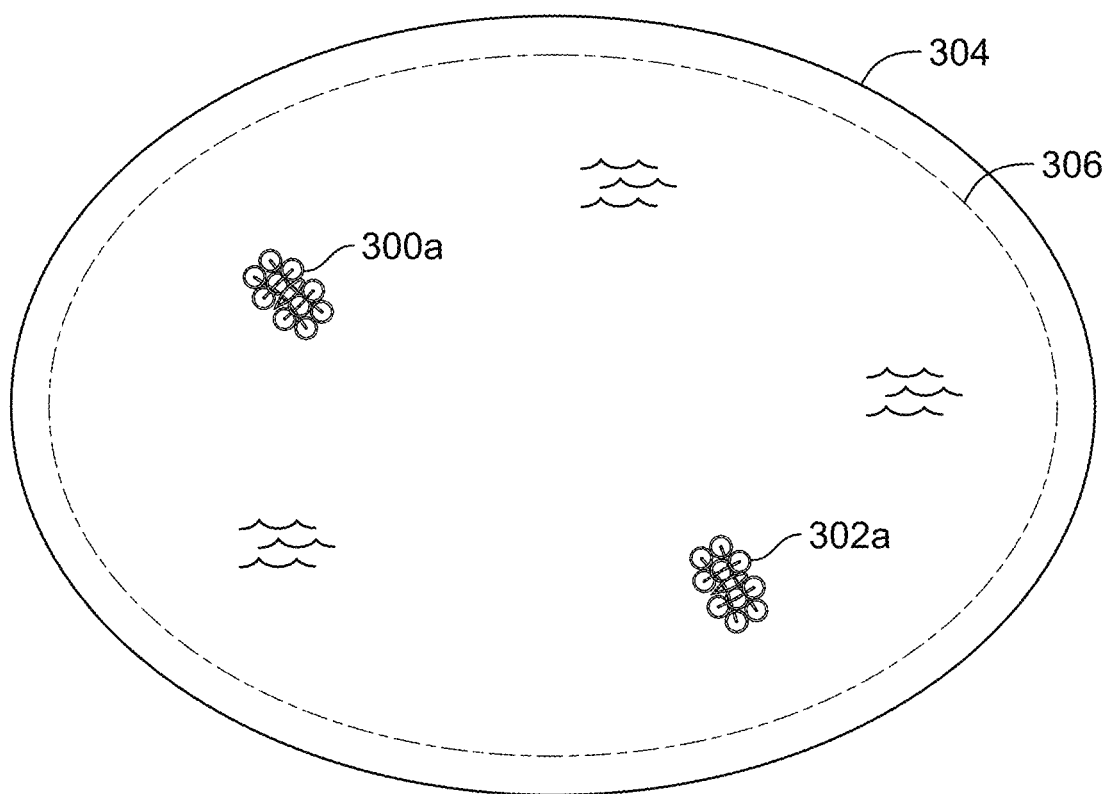
FIG. 3A is a diagram illustrating a top view of an embodiment of three-dimensional (3D) flying spaces associated with layers.

FIG. 3A is a diagram illustrating a top view of an embodiment of three-dimensional (3D) flying spaces associated with layers. In the example shown, two aircraft (300a and 302a) are flying over a lake (304). It is safer to fly over water than over ground, so in this example, 3D flying space 306 has a boundary that is completely over water. To ensure that the two aircraft flying over the lake do not collide with each other, the two aircraft are assigned to 3D flying spaces in different layers (i.e., non-overlapping ranges of altitudes). The following figure shows this more clearly.

Figure 3B:
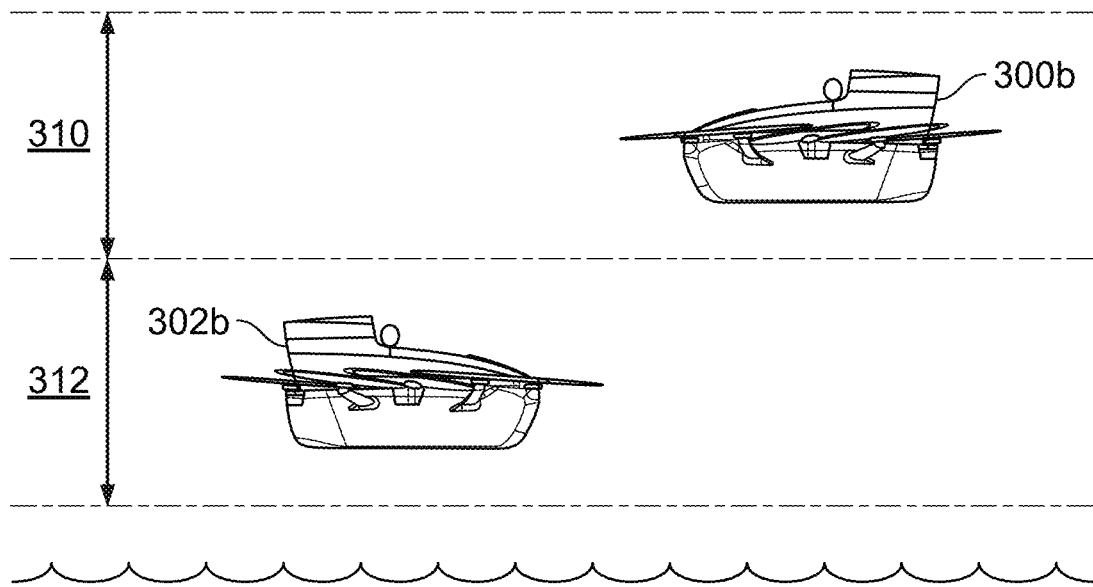
FIG. 3B is a diagram illustrating a side view of an embodiment of three-dimensional (3D) flying spaces associated with layers.

FIG. 3B is a diagram illustrating a side view of an embodiment of three-dimensional (3D) flying spaces associated with layers. In the example shown, the first aircraft (300*b*) is assigned to a 3D flying space (310) corresponding to an upper layer or top range of altitudes and the second aircraft (302*b*) is assigned to a 3D flying space (312) corresponding to a lower layer or bottom range of altitudes. This permits the two aircraft to fly over the lake at the same time while preventing collisions between the two aircraft.

For compactness, the example shown here has no gap or buffer zone between 3D flying space 310 and 3D flying space 312. In some embodiments, there is some gap or buffer zone between adjacent layers to further ensure the safety of the pilots and those around them.

With 3D flying spaces (e.g., which are virtual and are not necessarily demarcated in a physical manner in the sky using lasers, smoke, etc.), it would be helpful to display or otherwise provide information associated with a 3D flying space to the pilot and/or the location of the aircraft (e.g., so that the pilot does not inadvertently and/or unknowingly bump up against the boundaries of the 3D flying space). The following figure describes one example of such a process.

Figure 4:
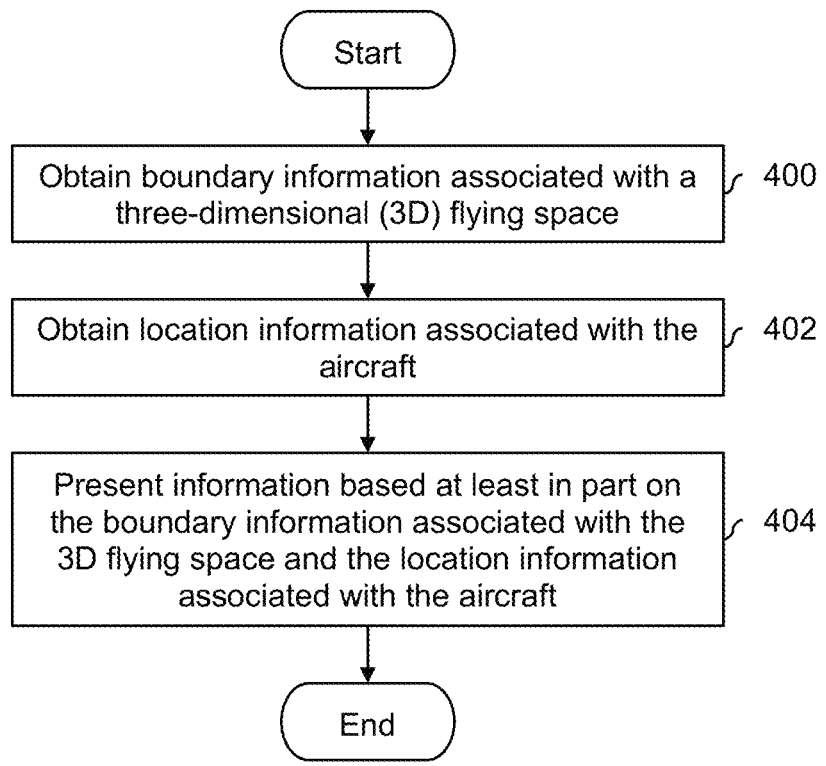
FIG. 4 is a flowchart illustrating an embodiment of a process to present information associated with a three-dimensional (3D) flying space.

FIG. 4 is a flowchart illustrating an embodiment of a process to present information associated with a three-dimensional (3D) flying space. In some embodiments, the information is presented via a display in an aircraft which obeys or otherwise enforces the boundaries of a 3D flying space. In some embodiments, the information is presented via some other user interface including (but not limited to) the hand controls of the aircraft, directional arrows (e.g., indicating a suggestion direction of correction), speakers, etc.

At 400, boundary information associated with a three-dimensional (3D) flying space is obtained. For example, boundary information which describes the three-dimensional flying space may be received. 3D flying space 100 and 3D flying space 110 in FIG. 1 show examples of a 3D flying space from a top view. Cross-sectional areas 200 and 204 in FIG. 2 show examples of a cross-sectional area of a 3D flying space. In general, information is obtained at 300 which tells the aircraft where it is permitted to fly (i.e., inside its 3D flying space) and where it is not permitted to fly (i.e., outside its 3D flying space).

In some embodiments, some segments or sections of the three-dimensional flying space have one set of rules (e.g., about the permitted directions of flight) and other segments or sections have different rules. For example, suppose that permitted route 100 in FIG. 1 instead had a "main loop" with multiple, bidirectional entrances and exits (e.g., for more compact routing and/or efficient use of space, as described above). In some embodiments, the information received or otherwise obtained at step 300 identifies which sections or parts of a 3D flying space have what set of associated rules (e.g., some indication that a "one way only rule" only applies to the main loop of a 3D flying space).

At 402, location information associated with the aircraft is obtained. For example, this information may be received from a GPS system in the aircraft and may include the aircraft's latitude, longitude, and altitude (i.e., a position or location within 3D space).

At 404, information is presented based at least in part on the boundary information associated with the 3D flying space and the location information associated with the aircraft. In some embodiments, the information presented is a warning (e.g., in advance of any automatic intervention by the aircraft to keep the aircraft in the 3D flying space) that the aircraft is getting too close to the boundary of a 3D flying space. Various embodiments of this are described in more detail below where a variety of user interfaces (e.g., displays, speakers, force feedback hand controls, etc.) may be used to present or otherwise display such a warning.

In some embodiments, the information presented is the boundaries of the 3D flying space and/or the location of the aircraft. As will be described in more detail below, a variety of user interfaces may be used (e.g., displays, speakers, etc.) and the information may be visual information (e.g., an icon or avatar representing the aircraft with the boundaries of the 3D flying space indicated) or audio information (e.g., an audible message or announcement about the distance between the aircraft's current location and the boundary of the 3D flying space in a specified or announced direction).

In some embodiments, information in addition to boundary information but also associated with the 3D flying space is obtained at step 400 and presented at step 404. For example, in FIG. 1, 3D flying space 100 has a permitted direction of flight where the aircraft is permitted to fly in a clockwise direction through the path shown but not in a counterclockwise direction. In some embodiments, step 400 includes receiving information associated with a permitted direction of flight (e.g., clockwise) and that information is displayed at step 404 (e.g., a direction arrow). In some embodiments, a (e.g., section of) 3D flying space has a speed limit and that speed limit is obtained at step 400 and presented at step 404. These are some examples and are not intended to be limiting.

The following figure shows an example of a system which performs the process of FIG. 4.

Figure 5:
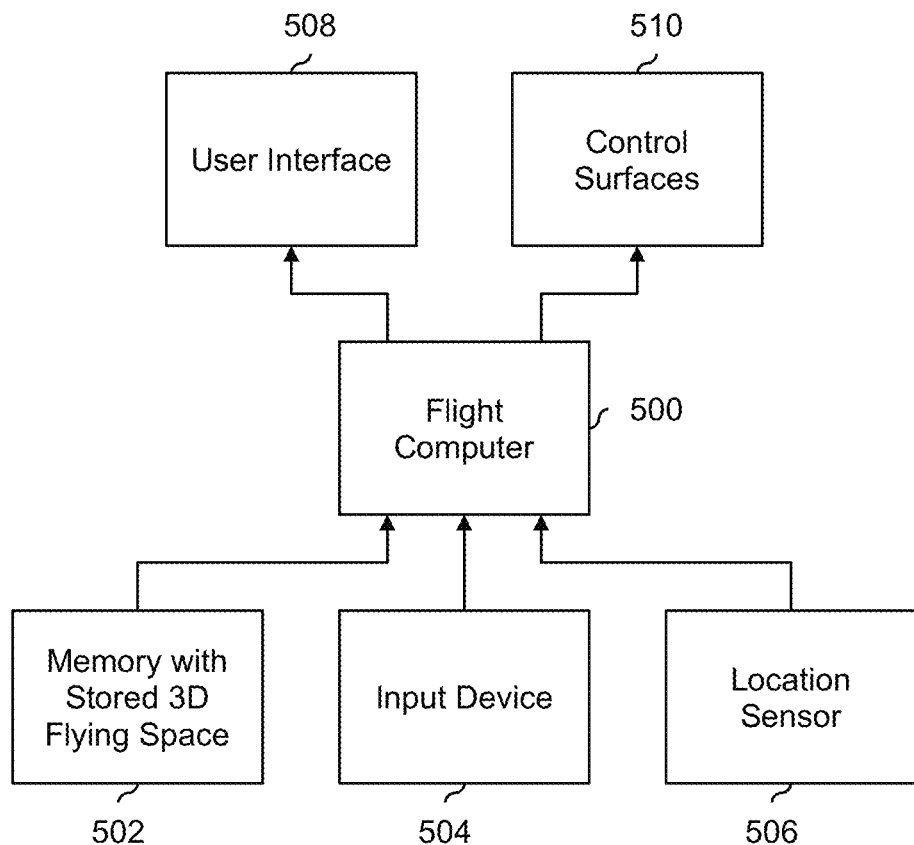
FIG. 5 is a block diagram illustrating an embodiment of blocks in an aircraft associated with presenting information based at least in part on boundary information associated with a three-dimensional (3D) flying space and location information associated with the aircraft.

FIG. 5 is a block diagram illustrating an embodiment of blocks in an aircraft associated with presenting information based at least in part on boundary information associated with a three-dimensional (3D) flying space and location information associated with the aircraft. In some embodiments, the steps described in FIG. 4 are performed by and/or using the blocks or modules shown here.

In this example, the boundary information associated with a 3D flying space is stored in memory 502. In various embodiments, the selection or assignment of a particular 3D flying space for a given aircraft may be performed in a variety of ways. In some embodiments, there is some assignor or other device which assigns a 3D flying space to a particular aircraft and the 3D flying space information which is stored in 502 is obtained from such an assignor.

Alternatively, in some embodiments there is no assignor or other authority and each aircraft selects for themselves what their 3D flying space is. In some such embodiments, memory 502 stores a number of predefined 3D flying spaces associated with particular locations and listens on a wireless channel for any aircraft which are already present in the vicinity and which predefined 3D flying spaces those aircraft have already claimed. For example, referring back to FIG. 1, the aircraft may know from its GPS system that it is on the San Francisco waterfront and may therefore retrieve two predefined 3D flying spaces associated with that area. In the example of FIG. 1, the aircraft has its choice of either a first (predefined) 3D flying space (e.g., 100 in FIG. 1) or a second (predefined) 3D flying space since no other aircraft are present and all 3D flying spaces are free. In this example, the aircraft chooses to occupy the first 3D flying space (e.g., the outer loop 100 in FIG. 1) and therefore begins periodically transmitting a broadcast (e.g., over a wireless channel), indicating that it is occupying the first 3D flying space.

Input device 504 (e.g., a joystick, an up-down thumbwheel, etc.) is used to receive an input associated with flying or otherwise controlling an aircraft from a pilot. In some embodiments, an input device (504) is also a user interface (508) via which information is presented to the pilot (e.g., aircraft is too close to the boundary of the 3D flying space). In various embodiments, the user interface is vibrational, includes force feedback, etc.

Location sensor (506) provides the location of the aircraft to flight computer 500 and in some embodiments is a GPS system. As described above, the flight computer (500) will respond to the input from the pilot, so long as the pilot's input or instructions do not cause the aircraft to leave the 3D flying space.

Using these inputs, the flight computer (500) generates two output signals: one or more control signals to one or more control surfaces (510) and information to present or otherwise display to the pilot (e.g., based on the 3D flying space, the location of the aircraft, etc.) via the user interface (508). For example, for multiple 202/206 in FIG. 2, the only control surfaces are the thrust or rotational speed of the ten rotors (e.g., there are no flaps which lift up/down, the rotors do not tilt, etc.). If the pilot (e.g., via the input device 504) were to steer the aircraft toward the boundary of the 3D flying space, the flight computer (500) would generate control signals for the control surfaces (510) which would keep the aircraft in the 3D flying space (e.g., by ignoring the pilot's inputs via a joystick or thumbwheel, as or if needed). In some embodiments, the computer could also ignore input in the invalid direction only (e.g., the 3D boundary could cause modified pilot input to the flight computer).

The flight computer (500) also generates information or signals to be presented via user interface 508. In various embodiments, the user interface may be a display which presents visual information (e.g., the boundaries of the 3D flying space, an icon or avatar of the aircraft showing the position or location of the aircraft relative to the 3D flying space, a permitted direction of flight, a speed limit, etc.), a speaker which presents audio information (e.g., an audible warning when the aircraft gets too close to the boundary of a 3D flying space), and a force feedback hand control (e.g., a force feedback joystick, a force feedback thumbwheel, etc.) which outputs more resistance or force as the aircraft gets closer and closer to the boundary of the 3D flying space. The following figures describe some exemplary user interfaces and exemplary presented information in more detail.

Figure 6:
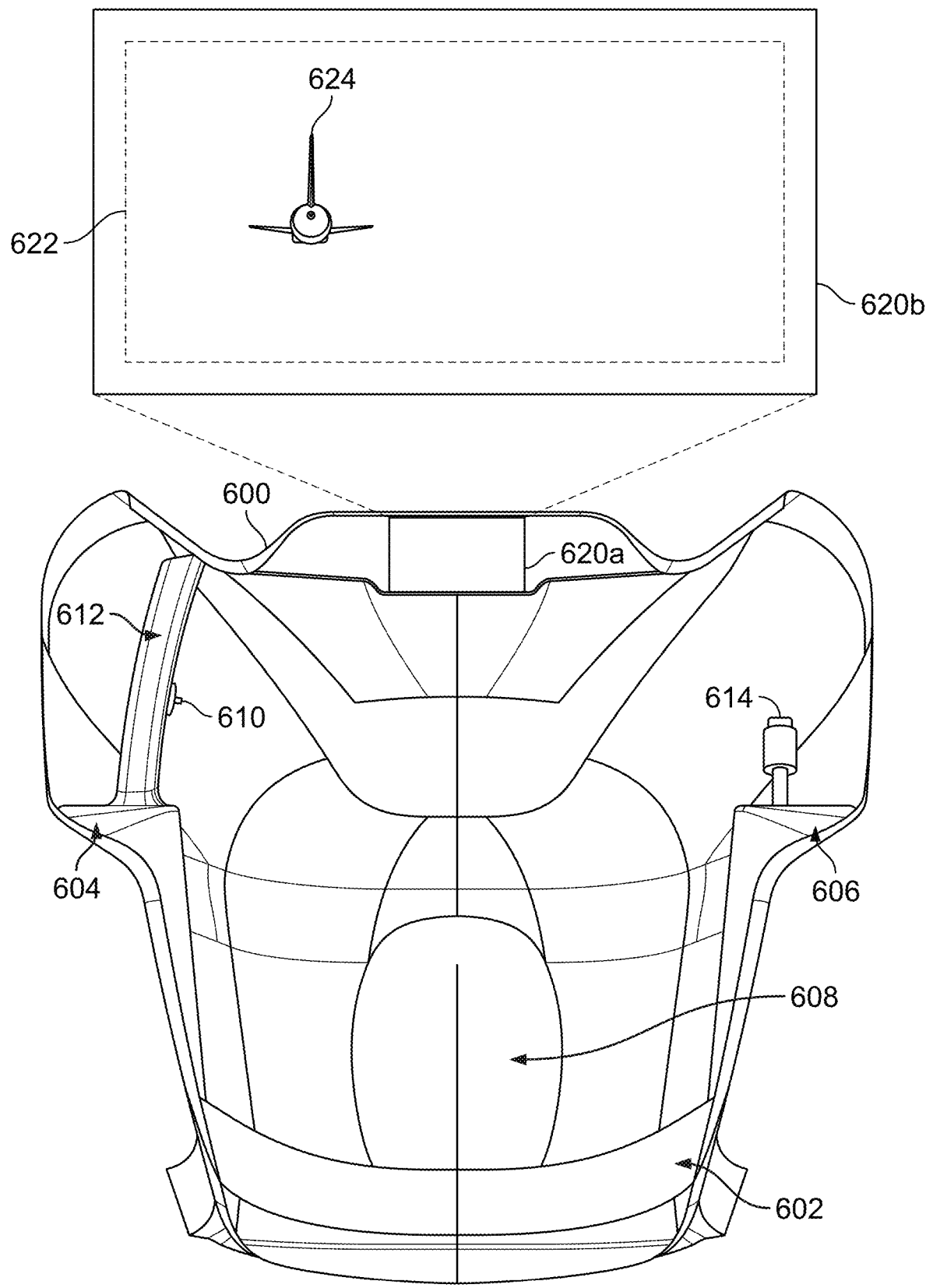
FIG. 6 is a diagram illustrating an embodiment of a display which is configured to display an aircraft's position relative to the boundaries of a three-dimensional (3D) flying space.

FIG. 6 is a diagram illustrating an embodiment of a display which is configured to display an aircraft's position relative to the boundaries of a three-dimensional (3D) flying space. In the example shown, a cutaway view of the cockpit is shown looking toward the front of the multicopter. For context, the cutaway view of the cockpit includes a windshield (600), seat (602), left armrest (604), right armrest (606), and footwell (608).

In this example, the pilot's left hand controls a single axis thumbwheel (610). The thumbwheel (610) is mounted to the (left) handgrip (612) on the side or surface of the handgrip that faces into the cockpit. The thumbwheel is spring centered so that the thumbwheel returns to the centered position if the pilot releases the thumbwheel. When the thumbwheel is pushed up, the aircraft ascends. Conversely, when the thumbwheel is pushed down, the aircraft descends. The speed at which the multicopter ascends or descends corresponds to the degree or amount of displacement experienced by the thumbwheel. Although these example show specific hand controls, it is noted that these feedback techniques may be adapted for any hand control.

The pilot's right hand controls a three-axis fingertip joystick (614). A fingertip joystick offers fingertip control and is generally smaller and offers less resistance than a hand-controlled joystick (e.g., where the pilot's hand would wrap around a hand-controlled joystick). The first axis is a vertical (e.g., yaw) axis extending upward from the top of the joystick where the joystick's knob or tip can be twisted about this axis in the clockwise direction or counterclockwise direction. Turning the twistable knob of the joystick causes the multicopter to correspondingly rotate about a vertical or yaw axis. The other two axes of the joystick are the x (e.g., roll) axis and y (e.g., pitch) axis (e.g., the pilot pushes the joystick in any direction and/or to any degree). Pushing the joystick controls the multicopter's movement within a plane formed or otherwise defined by the roll axis and pitch axis. For example, pushing the joystick forward causes the multicopter to fly forward and pulling the joystick backward causes the multicopter to fly backward.

In this example, the windshield (600) includes a display (620a) which is configured to display the aircraft's position relative to a 3D flying space. Display 620b shows a larger, more detailed view of the display. In this example, the 3D flying space is path-like where it is much longer than it is wider or taller and the cross-section of the exemplary 3D flying space is rectangular (e.g., similar to rectangular cross-section 204 shown in FIG. 2). In one example, display 620b may be present or otherwise display the information shown while an aircraft is flying through 3D flying space 100 or 3D flying space 110 in FIG. 1.

Within display 620b, the position of cross-sectional boundary 622 remains fixed (e.g., assuming that the cross-section does not change as the aircraft travels along the exemplary path). Within that fixed frame of reference, an icon or avatar which represents the aircraft (624) is updated based on the current position of the aircraft, relative to the 3D flying space. In this view, the position of the aircraft's avatar is not updated as the aircraft moves forwards or backwards along the path (e.g., along a longitudinal or roll axis) but is updated as the aircraft moves up or down (e.g., along a vertical or yaw axis) and/or left or right (e.g., along a lateral or pitch axis).

In this example, color is used to indicate whether the aircraft's position, relative to the boundaries of the 3D flying space, is good or bad (this example assumes only two states). If the aircraft is relatively centered and is therefore in a good position relative to cross-sectional boundary 622 (e.g., not crossing any of thresholds 220, 222, 224, or 226 in FIG. 2), then all of the edges in boundary 622 are displayed in green (not shown). If the aircraft gets too close to the boundary on any side (e.g., any one of thresholds 220, 222, 224, or 226 in FIG. 2 is crossed), then the too-close edge(s) is/are displayed in red whereas the good edges (i.e., at a safe or sufficient distance from the aircraft) are displayed in green. For example, for the state shown in display 620b, the left border or edge of cross-sectional boundary 622 would be displayed in red but the top, right, and bottom edges would be green. Naturally, it is not necessary to use color to convey this information and a variety of feedback or presentation techniques (e.g., visible, audible, haptic, etc.) may be used.

In the state shown here, the aircraft is vertically centered within the 3D flying space (e.g., it is equidistant from the top border as it is from the bottom border) but it is relatively close to the left-hand border of the 3D flying space. The pilot, if desired, may observe this in the display (620*b*) and use the joystick (614) to move the aircraft to the right so that the aircraft is better centered within the boundary or cross section of the 3D flying space (622). Naturally, the position of the aircraft's avatar (624) is updated within the display as the pilot steers or otherwise adjusts the position of the aircraft.

Depending upon the application (e.g., cost and/or weight considerations), the display may include other types of information (e.g., visual information). For example, in some embodiments, the aircraft includes a forward-facing camera and the display includes a current and/or real-time video feed of what the pilot sees (e.g., with the aircraft avatar and boundary markers superimposed on the real-time video). Alternatively (e.g., to keep cost and/or weight down), the display may not present any real-time video or views. Other information such as remaining battery life, aircraft speed, wind speed, etc. may also be displayed via the display (620*a*/620*b*). In some embodiments, a path-like 3D flying space has a direction of flight (e.g., the path-like 3D flying space is a one-way street). In some such embodiments, a display includes an arrow to indicate the (enforced) direction of flight.

As an aircraft flies through a 3D flying space, the boundaries may change and the information presented may be varied accordingly. For example, suppose the aircraft enters a part of a 3D flying space where the cross-sectional area increases. To convey this, in one example, the aircraft's avatar (624) is shrunk so that the relative size of the aircraft's avatar compared to the size of the boundary 622 is smaller.

Or, suppose that the aircraft enters a part of a 3D flying space where the lateral or side boundaries open up but the top and bottom boundaries remain relatively the same (e.g., so that the 3D flying space is more like the example of FIG. 3A and FIG. 3B). To convey this, in some embodiments, the side boundaries are not shown in the display until the aircraft gets closer to the relevant boundary. In some embodiments, a top view is presented or otherwise displayed to better convey the (e.g., forward) distance between an aircraft and a boundary (e.g., as the aircraft flies forward towards the edge of boundary 306 in FIG. 3A).

In some embodiments, instead of using a display in the aircraft to present the information, a virtual reality technique is used to present or otherwise display information. In one example, a pilot wears a virtual reality (VR) headset which is used to display or otherwise indicate the boundaries of the 3D flying space (e.g., superimposed on the pilot's real-time field of view).

In some embodiments, a display or other user interface indicates or otherwise presents advance information about a part of the 3D flying space coming up. The following figure shows an example of this.

Figure 7:
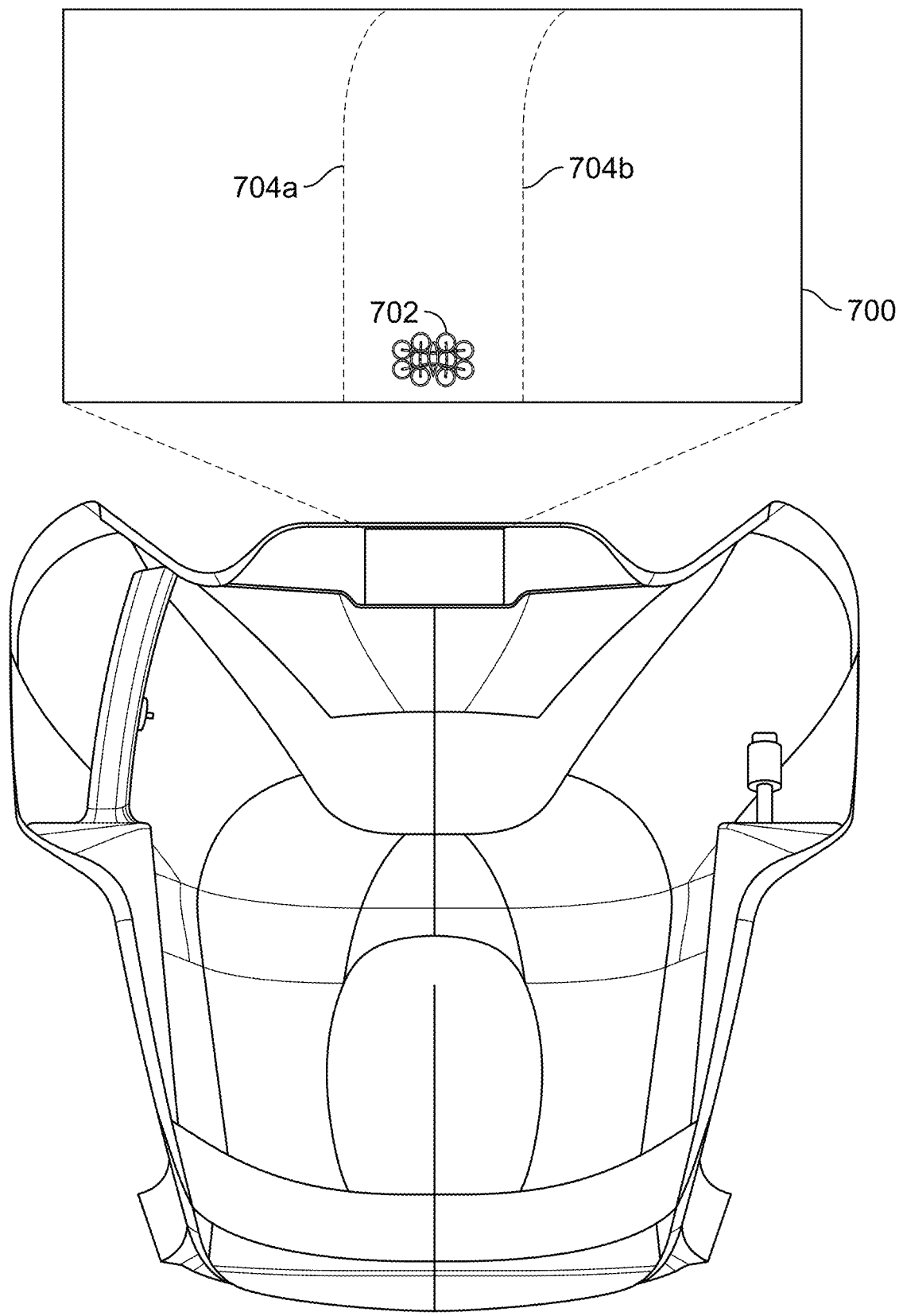
FIG. 7 is a diagram illustrating an embodiment of a display showing a top view of an aircraft's position relative to the boundaries of a three-dimensional (3D) flying space.

FIG. 7 is a diagram illustrating an embodiment of a display showing a top view of an aircraft's position relative to the boundaries of a three-dimensional (3D) flying space. In this example, the aircraft is flying along 3D flying space 100 or 3D flying space 110 in FIG. 1. Display 700 shows a top view with an icon or avatar for the aircraft (702) as well as the boundaries (704*a* and 704*b*) of the 3D flying space. With this information (e.g., including advance information), the pilot can see that the path is about to bend to the right. It may be helpful for the pilot to have advance notice about an upcoming change to a 3D flying space so that the pilot can time the turning of the aircraft to match the bend of the path so that the aircraft does not run into the boundary (e.g., 704*a* or 704*b*) of the 3D flying space.

In some embodiments (e.g., for cost and/or weight reasons), an aircraft does not include a display. The following figure describes some embodiments where other types of user interfaces are used.

Figure 8:
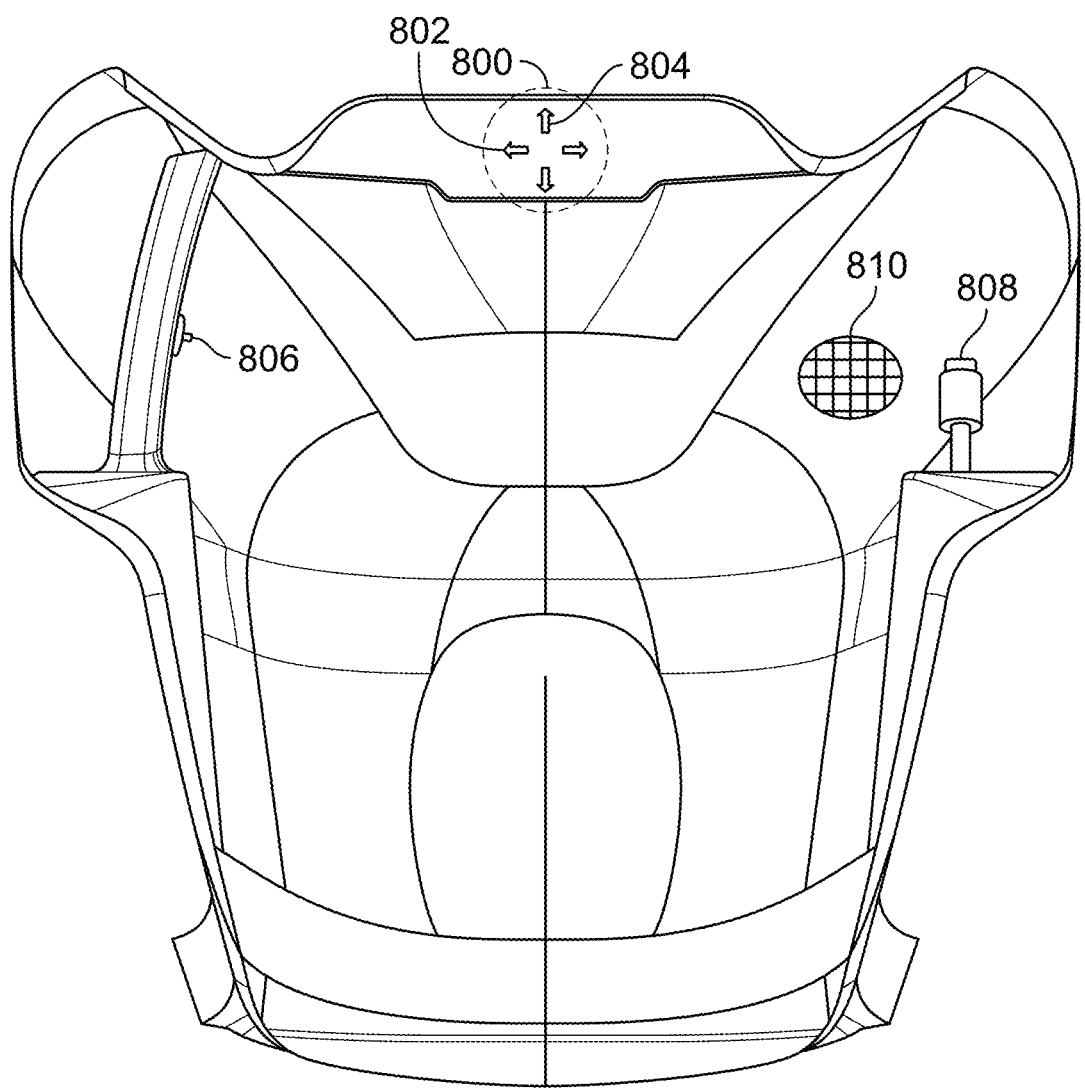
FIG. 8 is a diagram illustrating an embodiment of arrow indicators, speakers, and hand controls which are used to present information.

FIG. 8 is a diagram illustrating an embodiment of arrow indicators, speakers, and hand controls which are used to present information. In various embodiments, arrow indicators 800 are used for a variety of purposes. In one example, arrow indicators 800 are used to indicate a direction in which a pilot should move to correct the current position of the aircraft relative to the boundaries of a 3D flying space, as or if needed. In this example, the aircraft is flying through a 3D flying space with a rectangular cross-section such as that shown in 204 in FIG. 2. When the aircraft is relatively centered within the exemplary rectangular cross-section (e.g., not crossing any of top threshold (220), bottom threshold (222), left threshold (224), or right threshold (226) in FIG. 2), none of corrective indicators 800 are illuminated or otherwise on.

However, if the aircraft were to cross the right threshold 226 in FIG. 2 (as an example), the left arrow (802) would be illuminated, indicating that the aircraft is too close to the right edge or border of the 3D flying space and should move to the left to correct for that. Or, if the aircraft were to cross the bottom threshold (222) in FIG. 2, then the up arrow 804 would be illuminated to suggest that the pilot move the aircraft upwards so that the aircraft is better centered within the 3D flying space.

In this example, the hand controls (i.e., up-down thumbwheel 806 and joystick 808) are not expected to be used at the same time. In fact, novice pilots may find it more comfortable to use only one hand control at a time (e.g., so they can more easily focus on the response of the aircraft to just a single hand control). To avoid overwhelming a novice pilot with too complex of a correction and/or a correction suggestion which would require the simultaneous use of the thumbwheel (806) and the joystick (808), in some embodiments only one of the four arrow indicators (800) is illuminated at any given time so that the pilot only has to worry about manipulating one hand control to make the correction suggested. For example, a correction for the most egregious threshold or boundary crossing may be indicated first (e.g., illuminate up arrow corrective indicator 804 first instead of illuminating both up arrow 804 and left arrow 802). Then, once a sufficient correction has been performed along that axis, the smaller correction along the orthogonal axis may be suggested (e.g., illuminate left arrow 802). Another way to describe this is to say that a correction suggestion which would require the simultaneous use of two input devices (e.g., one manipulated by the pilot's right hand and the other by the pilot's left hand) is simplified or otherwise reduced to a correction suggestion which only requires the use of a single input device (e.g., which only requires the use of the right hand or the left hand).

Similarly, it may be desirable to have at most four arrow indicators (800), as shown here. For example, if there were also an up-right arrow, a down-right arrow, a down-left arrow, and an up-left arrow, any of those correction suggestions would require the simultaneous use of up-down thumbwheel 806 and joystick 808 which may be difficult for novice pilots. More generally, in some embodiments, correction suggestions or indications which would require the simultaneous use of multiple hand controls are not presented.

In some embodiments, arrow indicators 800 are used to provide advance information (e.g., about an upcoming section of the 3D flying space). For example, as described above, some path-like 3D flying spaces may be straight in some sections and curved in the other sections. In some embodiments, an appropriate arrow indicator is used to indicate or otherwise suggest an upcoming maneuver so that the aircraft can stay on course and/or on track with the 3D flying space and not bump up against the boundaries.

The exemplary arrow indicators may be modified as desired (e.g., to convey more and/or different information). For example, to preserve the readability of the figure, only a single size or single length of arrow indicators is shown. In some embodiments there are different sized or different lengths arrows (e.g., to indicate different degrees or amounts of correction or different degrees of turning up ahead). For example, a shorter and/or smaller arrow may be used to suggest a smaller amount of correction or a smaller upcoming turn whereas a longer and/or larger arrow may be used to suggest a larger amount of correction or a sharper upcoming turn.

In some embodiments, audio information about the position of the aircraft relative to the boundaries of the 3D flying space is provided via speaker 810. For example, while the aircraft is not in any danger of crossing the boundary of a 3D flying space (e.g., not crossing any of thresholds 220, 222, 224, or 226 in FIG. 2), speaker 810 may be silent or may periodically indicate this (e.g., "The aircraft is not near any boundaries of the 3D flying space."). However, should any of thresholds 220, 222, 224, or 226 in FIG. 2 be crossed, the speaker may issue an audible suggestion or correction (e.g., "Please steer the aircraft to the right."). As before, the audible suggestions may be limited to suggestions that only require the use of a single hand and/or single input device and which would not require the simultaneous use of two input devices (e.g., where both hands would be required).

In some embodiments, speaker 810 is used to provide audible advance information. For example, "There is a 15 degree turn to the right coming up in 5 seconds. 5, 4, 3, 2, 1. Please turn to the right 15 degrees now."

In some embodiments, haptic information is provided via a hand control, such as thumbwheel 806 or joystick 808. For simplicity and ease of explanation, joystick 808 will be used as an example. Suppose that joystick 808 is a force feedback joystick where the joystick can provide a variable amount of resistance when the joystick is displaced from center. In some embodiments, force feedback is used to indicate or otherwise signal when an aircraft is getting too close to a boundary of a 3D flying space. For example, while an aircraft is in the center of cross-section 204 in FIG. 2, joystick 808 does not output any force feedback (e.g., the pilot feels no significant resistance when displacing the joystick from the center).

However, suppose the pilot (e.g., in a straight section of the 3D flying space) steers the aircraft to the left using joystick 808 such that left threshold 224 in FIG. 2 is crossed. The crossing of the left threshold may cause the joystick to output an increasing amount of force feedback (e.g., the joystick is pushing back against the pilot's hand, towards the center position) as the aircraft gets closer to the left edge of cross-sectional boundary 204. This may signal to that pilot that the aircraft does not want the pilot to continue steering the aircraft to the left. If the pilot were to push the joystick to the right (e.g., to return the aircraft to a more centered position), there would be little or no force feedback from the joystick in that direction (e.g., because it is a desired or good direction).

Another way to describe this is that the input devices (e.g., thumbwheel 806 and joystick 808) vary the haptic output (e.g., the force feedback generated by the joystick) to give a kind of "spring-centered" feeling to the center of the tube or other 3D flying space (e.g., which depends upon the position of the aircraft relative to or within the tube, and which does not depend upon the displacement of the joystick). This may also be used with tube or path-like 3D flying spaces to convey when a tube or path has turned and the aircraft has not correspondingly turned (e.g., the pilot (e.g., inadvertently and/or unknowingly) keeps the aircraft on straight trajectory 106 in FIG. 1 but the path bends at curve 108). Haptic information or feedback via an input device (e.g., a joystick or thumbwheel) may be attractive because information (e.g., about the boundaries of the tube or other 3D flying space) can be conveyed to the pilot without requiring split attention or visual diversion.

In some embodiments, the amount of force feedback varies with the distance between the aircraft and the (e.g., relevant) edge or boundary. For example, as the aircraft gets closer and closer to the edge or boundary, the amount of force feedback correspondingly increases. The amount of force feedback is not (at least in this example) dependent on the amount of joystick displacement. For example, for a given distance between the aircraft and a boundary of a 3D flying space, the same amount of force or resistance output by the joystick (or other hand control) would be the same for a relatively small amount of joystick displacement (e.g., the aircraft is moving relatively slowly in the indicated direction) as well as for a relatively large amount of joystick displacement (e.g., the aircraft is moving relatively quickly in the indicated direction).

The following figures describe the above examples more generally and/or formally in flowcharts.

Figure 9:
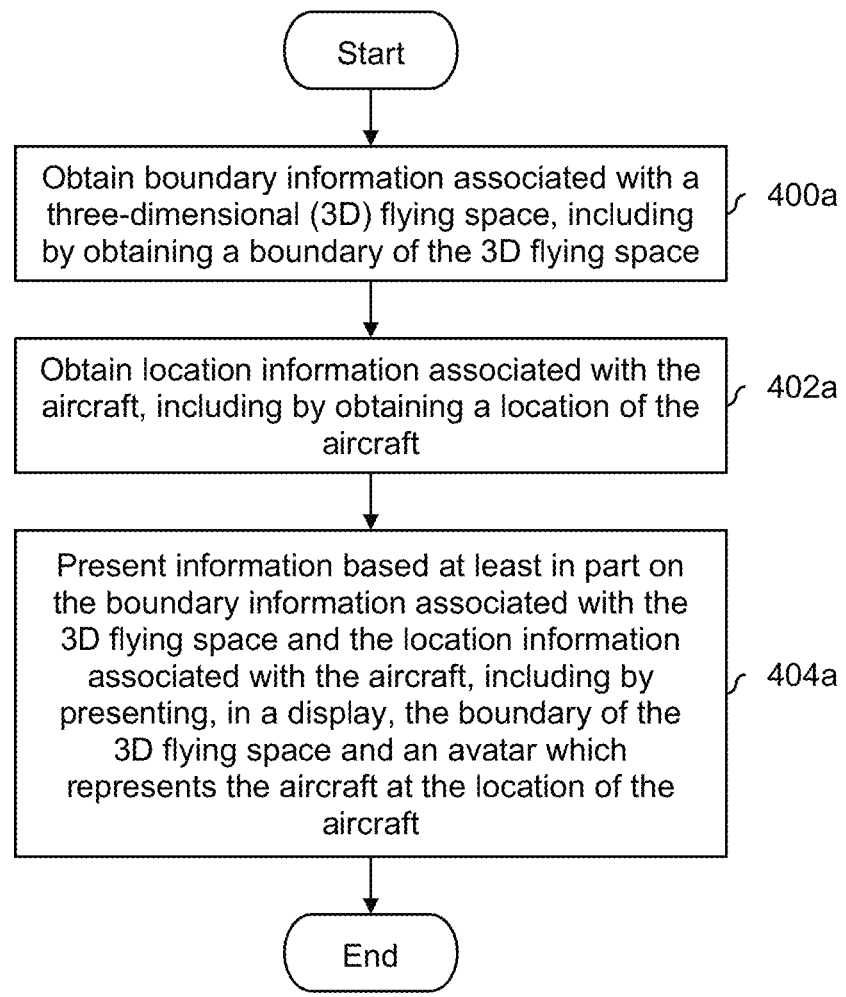
FIG. 9 is a flowchart illustrating an embodiment of a process to present information using a display.

FIG. 9 is a flowchart illustrating an embodiment of a process to present information using a display. FIG. 9 is similar to FIG. 4 and for convenience related steps are indicated using the same or similar reference numbers.

At 400a, boundary information associated with a three-dimensional (3D) flying space is obtained, including by obtaining a boundary of the 3D flying space. See, for example, FIGS. 1-3B which show some examples of 3D flying spaces and their boundaries.

At 402a, location information associated with the aircraft is obtained, including by obtaining a location of the aircraft. For example, the aircraft may include a GPS system and the aircraft's location is obtained from the GPS system.

At 404a, information is presented based at least in part on the boundary information associated with the 3D flying space and the location information associated with the aircraft, including by presenting, in a display, the boundary of the 3D flying space and an avatar which represents the aircraft at the location of the aircraft. See, for example, FIG. 6 where display 620b presents aircraft avatar 624 and cross-sectional boundary 622. This, for example, enables the pilot to see how close or far away they are from the boundary of the 3D flying space. FIG. 7 shows a top view with aircraft icon 702 and boundaries 704a and 704b.

In some embodiments, additional information is also presented via the display at step 404a. For example, a speed limit associated with the 3D flying space and/or a permitted direction of flight associated with the 3D flying space may be presented in the display.

In some embodiments, the display is a virtual reality (VR) headset. In some embodiments, the display is an integrated and/or touchscreen display in the aircraft.

In some embodiments, the display presents a warning when a distance between the location information and the boundary of the 3D flying space is less than (i.e., does not exceed) a threshold and presents no warning when the distance is greater than (i.e., exceeds) the threshold. For example, a border or background color may be red for the former and green for the latter.

Figure 10:
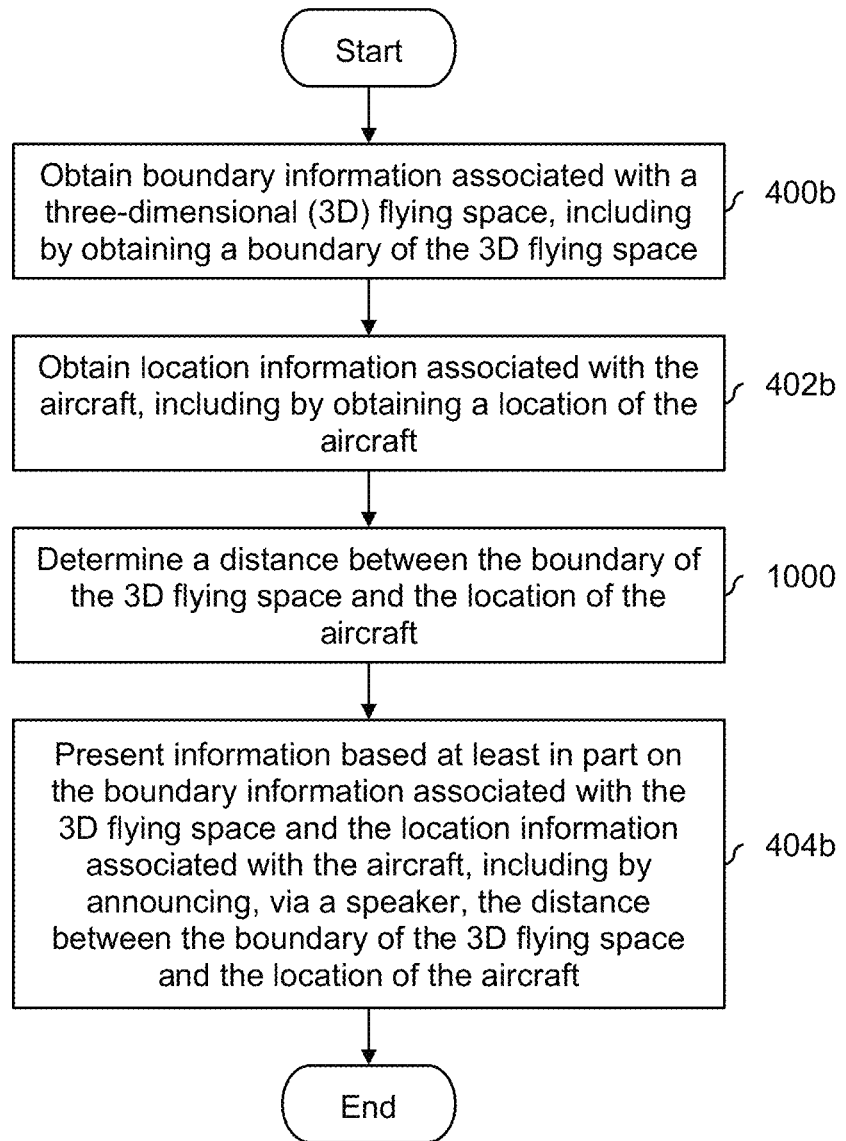
FIG. 10 is a flowchart illustrating an embodiment of a process to present information using a speaker, including a distance between the boundary of a three-dimensional (3D) flying space and the location of an aircraft.

FIG. 10 is a flowchart illustrating an embodiment of a process to present information using a speaker, including a distance between the boundary of a three-dimensional (3D) flying space and the location of an aircraft. FIG. 10 is similar to FIG. 4 and for convenience related steps are indicated using the same or similar reference numbers.

At 400b, boundary information associated with a three-dimensional (3D) flying space is obtained, including by obtaining a boundary of the 3D flying space.

At 402b, location information associated with the aircraft is obtained, including by obtaining a location of the aircraft.

At 1000, a distance between the boundary of the 3D flying space and the location of the aircraft is determined. For example, in FIG. 6, the distance between aircraft 624 and the left edge or border associated with boundary 622 may be determined.

At 404b, information is presented based at least in part on the boundary information associated with the 3D flying space and the location information associated with the aircraft, including by announcing, via a speaker, the distance between the boundary of the 3D flying space and the location of the aircraft. For example, speaker 810 may be used to make the announcement. In some embodiments, the distance is only announced when the aircraft is close to the boundary of the 3D flying space (e.g., because it may be less distracting to the pilot if the speaker is silent when the aircraft is not in any danger of leaving the 3D flying space).

In some embodiments, some other information (e.g., in addition to the distance between the boundary of the 3D flying space and the location of the aircraft, which is announced at step 404b) may be presented audibly using a speaker (e.g., a speed limit and/or if a section of the 3D flying space is one-way).

Figure 11:
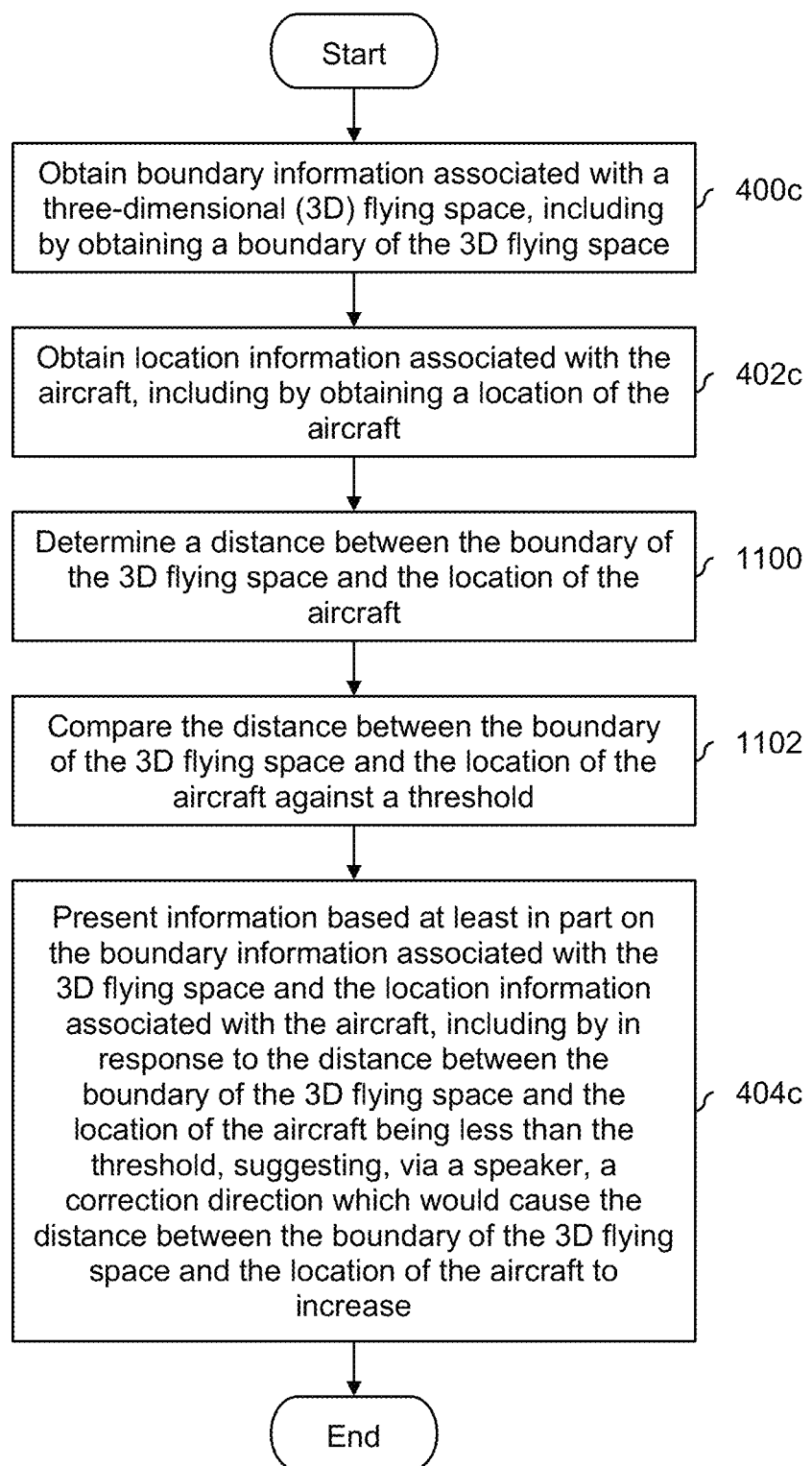
FIG. 11 is a flowchart illustrating an embodiment of a process to present information using a speaker, including a correction direction.

FIG. 11 is a flowchart illustrating an embodiment of a process to present information using a speaker, including a correction direction. FIG. 11 is similar to FIG. 4 and for convenience related steps are indicated using the same or similar reference numbers.

At 400c, boundary information associated with a three-dimensional (3D) flying space is obtained, including by obtaining a boundary of the 3D flying space.

At 402c, location information associated with the aircraft is obtained, including by obtaining a location of the aircraft.

At 1100, a distance between the boundary of the 3D flying space and the location of the aircraft is determined.

At 1102, the distance between the boundary of the 3D flying space and the location of the aircraft is compared against a threshold. For example, in FIG. 2, this would correspond to determining if aircraft 206 has crossed any of thresholds 220, 222, 224, or 226.

At 404c, information is presented based at least in part on the boundary information associated with the 3D flying space and the location information associated with the aircraft, including by in response to the distance between the boundary of the 3D flying space and the location of the aircraft being less than the threshold, suggesting, via a speaker, a correction direction which would cause the distance between the boundary of the 3D flying space and the location of the aircraft to increase. For example, when an aircraft is relatively centered in a 3D flying space (as aircraft 206 is in FIG. 2 where none of thresholds 220, 222, 224, or 226 is crossed), there may be no correction direction suggested via the speaker. However, should one of the thresholds be crossed (e.g., left threshold 224), then a correction direction may be suggested via the speaker (e.g., "Please move to the right"). Once the aircraft has moved away sufficiently (e.g., so that the threshold is no longer exceeded or crossed), the speaker may stop suggesting the correction direction.

As described above, in some embodiments, a correction direction may be simplified, reduced, or otherwise constrained to be a correction direction which only requires the use of one hand and/or one input device. For example, if the aircraft is too close to a top border and right border (and ideally should move down and to the left to be perfectly centered), only one of those directions would be suggested (e.g., only "Please move to the right" and not "Please move down and to the right"). As described above, suggesting a correction which would require the simultaneous use of both hands may overwhelm a novice and/or inexperienced pilot.

Figure 12:
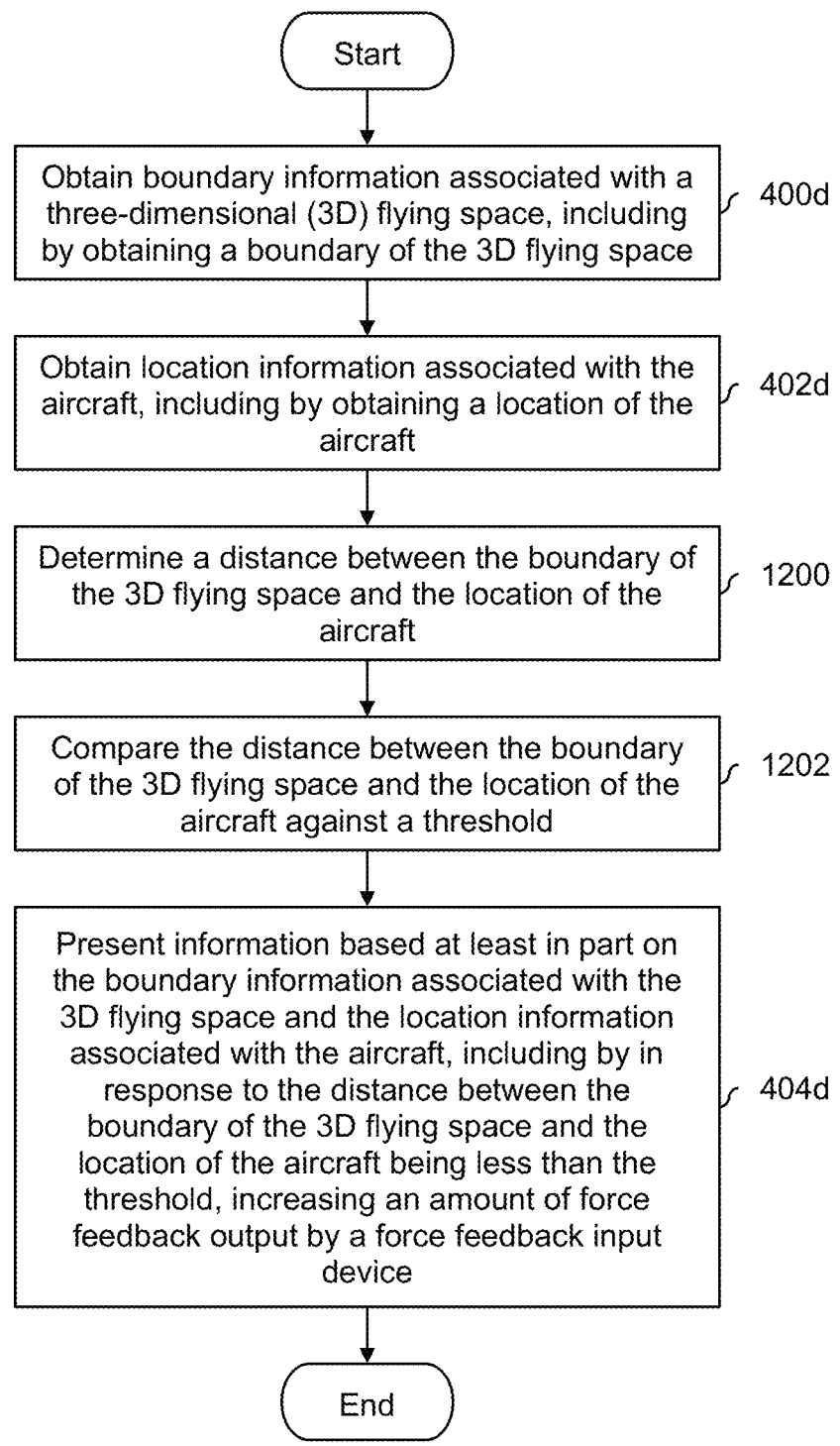
FIG. 12 is a flowchart illustrating an embodiment of a process to present information using a speaker, including a correction direction.

FIG. 12 is a flowchart illustrating an embodiment of a process to present information using a speaker, including a correction direction. FIG. 12 is similar to FIG. 4 and for convenience related steps are indicated using the same or similar reference numbers.

At 400d, boundary information associated with a three-dimensional (3D) flying space is obtained, including by obtaining a boundary of the 3D flying space.

At 402d, location information associated with the aircraft is obtained, including by obtaining a location of the aircraft.

At 1200, a distance between the boundary of the 3D flying space and the location of the aircraft is determined.

At 1202, the distance between the boundary of the 3D flying space and the location of the aircraft is compared against a threshold.

At 404d, information is presented based at least in part on the boundary information associated with the 3D flying space and the location information associated with the aircraft, including by in response to the distance between the boundary of the 3D flying space and the location of the aircraft being less than the threshold, increasing an amount of force feedback output by a force feedback input device. In some embodiments, the input device via which the direction suggestion is presented at step 404d includes one or more of the following: a thumbwheel, a joystick, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communications interface that obtains boundary information associated with a three-dimensional (3D) flying space, including a boundary of the 3D flying space, wherein the 3D flying space is defined by a cross section about a center path;
   a processor that continuously determines a distance between the boundary of the 3D flying space and a location of an aircraft; and
   a user interface that presents feedback in proportion to the determined distance between the boundary of the 3D flying space and the location of the aircraft, wherein the feedback includes at least one of resistance or force that increases in proportion to decreasing distance between the boundary of the 3D flying space and the location of the aircraft.

2. The system recited in claim 1, wherein the cross section defining the 3D flying space is one or more of the following: a circle, an ellipse, or a rectangle.

3. The system recited in claim 1, wherein the user interface includes one or more of the following: a virtual reality headset, a touchscreen display, or a display integrated into the aircraft.

4. The system recited in claim 1, wherein the user interface presents a speed limit associated with the 3D flying space.

5. The system recited in claim 1, wherein the user interface presents a permitted direction of flight associated with the 3D flying space.

6. The system recited in claim 1, wherein the user interface outputs, via a speaker, the distance between the boundary of the 3D flying space and the location of the aircraft.

7. The system recited in claim 1, wherein the user interface, in response to the distance between the boundary of the 3D flying space and the location of the aircraft not exceeding a threshold, outputs, via a speaker, a correction direction which would cause the distance between the boundary of the 3D flying space and the location of the aircraft to increase.

8. The system recited in claim 1, wherein the user interface, in response to the distance between the boundary of the 3D flying space and the location of the aircraft not exceeding a threshold, increases an amount of force feedback output by a force feedback input device.

9. The system recited in claim 1, wherein the user interface presents a representation of the aircraft showing the location of the aircraft relative to the 3D flying space.

10. A method, comprising:
   obtaining boundary information associated with a three-dimensional (3D) flying space, including a boundary of the 3D flying space, wherein the 3D flying space is defined by a cross section about a center path;
   continuously determining a distance between the boundary of the 3D flying space and a location of an aircraft; and
   presenting, in a user interface, feedback in proportion to the determined distance between the boundary of the 3D flying space and the location of the aircraft, wherein the feedback includes at least one of resistance or force that increases in proportion to decreasing distance between the boundary of the 3D flying space and the location of the aircraft.

11. The method recited in claim 10, wherein the cross section defining the 3D flying space is one or more of the following: a circle, an ellipse, or a rectangle.

12. The method recited in claim 10, wherein the user interface includes one or more of the following: a virtual reality headset, a touchscreen display, or a display integrated into the aircraft.

13. The method recited in claim 10, further comprising presenting, in the user interface, a speed limit associated with the 3D flying space.

14. The method recited in claim 10, further comprising presenting, in the user interface, a permitted direction of flight associated with the 3D flying space.

15. The method recited in claim 10, further comprising announcing, via a speaker, the distance between the boundary of the 3D flying space and the location of the aircraft.

16. The method recited in claim 10, further comprising suggesting, via a speaker, a correction direction which would cause the distance between the boundary of the 3D flying space and the location of the aircraft to increase in response to the distance between the boundary of the 3D flying space and the location of the aircraft not exceeding a threshold.

17. The method recited in claim 10, further comprising increasing an amount of force feedback output by a force feedback input device in response to the distance between the boundary of the 3D flying space and the location of the aircraft not exceeding a threshold.

18. The method recited in claim 10, further comprising presenting a representation of the aircraft showing the location of the aircraft relative to the 3D flying space.

19. A computer program product embodied in a non-transitory computer readable storage medium and comprising computer instructions for:
   obtaining boundary information associated with a three-dimensional (3D) flying space, including a boundary of the 3D flying space, wherein the 3D flying space is defined by a cross section about a center path;
   continuously determining a distance between the boundary of the 3D flying space and a location of an aircraft; and
   presenting, in a user interface, feedback in proportion to the determined distance between the boundary of the 3D flying space and the location of the aircraft, wherein the feedback includes at least one of resistance or force that increases in proportion to decreasing distance between the boundary of the 3D flying space and the location of the aircraft.

20. The computer program product recited in claim 19, wherein the cross section defining the 3D flying space is one or more of the following: a circle, an ellipse, or a rectangle.

\* \* \* \* \*

UNITED STATES PATENT AND TRADEMARK OFFICE
CERTIFICATE OF CORRECTION

| | |
|---|---|
| PATENT NO. | : 11,645,926 B2 |
| APPLICATION NO. | : 17/110220 |
| DATED | : May 9, 2023 |
| INVENTOR(S) | : Cameron Robertson and Alex Roetter |

It is certified that error appears in the above-identified patent and that said Letters Patent is hereby corrected as shown below:

In the Specification

In Column 10, Line(s) 2, delete "these example", and insert --these examples--, therefor.

Signed and Sealed this
Twenty-fourth Day of October, 2023

Katherine Kelly Vidal
*Director of the United States Patent and Trademark Office*